J. CZERWONKA.
ROUNDABOUT.
APPLICATION FILED APR. 24, 1920.
1,382,173.
Patented June 21, 1921.
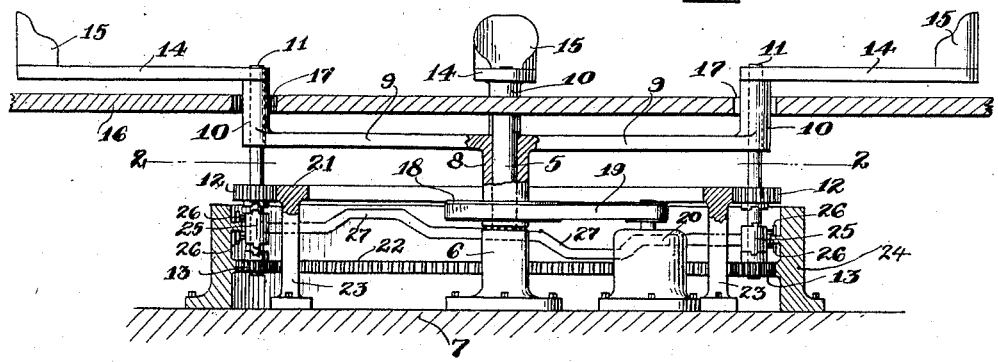
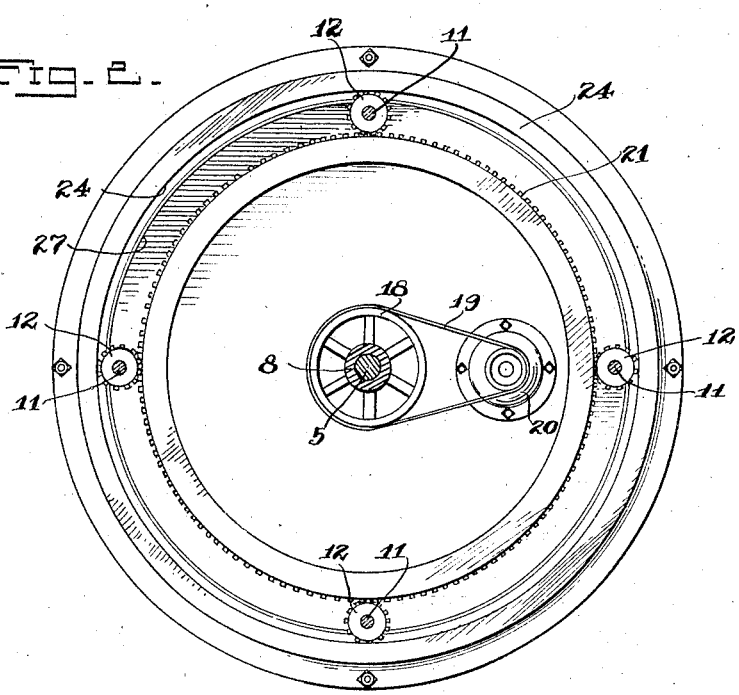
INVENTOR.
Joseph Czerwonka
BY
ATTORNEYS.

UNITED STATES PATENT OFFICE.

JOSEPH CZERWONKA, OF CHICAGO, ILLINOIS.

ROUNDABOUT.

1,382,173.  Specification of Letters Patent.  Patented June 21, 1921.

Application filed April 24, 1920. Serial No. 376,323.

*To all whom it may concern:*

Be it known that I, JOSEPH CZERWONKA, a citizen of the United States, residing at Chicago, in the county of Cook and State of Illinois, have invented certain new and useful Improvements in Roundabouts, of which the following is a specification.

This invention relates to amusement apparatus of the roundabout type, and its object is to provide a novel and improved apparatus of this kind having its passenger carriers so mounted and operated that they are carried around in a circular path and also swung around in alternately opposite directions.

The object stated is attained by means of a combination and arrangement of parts to be hereinafter described and claimed, and in order that the invention may be better understood, reference is had to the accompanying drawing forming a part of this specification.

In the drawing,

Figure 1 is an elevation of the apparatus, partly in section, and

Fig. 2 is a horizontal section on the line 2—2 of Fig. 1.

Referring specifically to the drawing, 5 denotes an upright stationary shaft or post rising from a base 6 fastened down on a suitable foundation 7. On this shaft is rotatably mounted a hub 8 carrying radial arms 9 which are horizontal and have their outer ends provided with vertical bearings 10 in which are journaled shafts 11, each of which latter carries at its lower end two pinions 12 and 13 respectively. The upper end of each vertical shaft 11 has a laterally extending horizontal arm 14 carrying at its outer end a seat or other suitable passenger support 15. The apparatus is located in a building or other suitable inclosure having a floor or platform 16 provided with a large opening 17 into which the bearings 10 extend so as to locate the arms 14 and the passenger supports 15 above said floor, said supports being thus made accessible from the floor.

On the hub 8 is a pulley 18 which is belted, as shown at 19, or geared to an electric motor 20. It will be understood, of course, that any other driving means for the hub 8 may be provided. When the hub 8 is rotated on its shaft 5, the passenger supports 15 are carried around in a circular path.

Arranged concentrically with respect to the hub 8, beneath the floor 16, are two stationary circular racks 21 and 22, respectively which are vertically spaced, and suitably supported in horizontal position. The upper rack 21 has external teeth and it is shown supported by posts 23 rising from the foundation 7. The lower rack 22 has internal teeth, and it is shown supported by an annular wall 24. The pinions 12 are in mesh with the rack 21, and the pinions 13 are in mesh with the rack 22.

When the hub 8 is being driven, the pinions 12 and 13 roll around the racks, 21 and 22, and by alternately locking said pinions to the shafts 11, the latter are given an alternating rotary movement, with the result that the arms 14 carrying the passenger supports 15 are swung back and forth, this motion being in addition to the circular motion imparted by the hub 8.

The pinions 12 and 13 are, of course, loose on the shafts 11, and a clutch device is provided for each pair of pinions, for alternately locking the same to their shaft 11. This clutch is controlled automatically by a means to be presently described.

Between each pair of pinions 12 and 13, the shaft 11 slidably supports a clutch member 25 having claws at each end so that when it is slid upwardly it is locked to the pinion 12, and when slid downwardly it is locked to the pinion 13, it being understood that the pinions are provided with coöperating clutch claws. When the clutch member 25 is midway between the pinions, clear of both, or in neutral position, no motion is transmitted to the shaft, and the passenger support 15 is now not swung back and forth but only revolves.

Each clutch member 25 is automatically shifted by being provided with a pair of rollers 26 straddling an annular track 27 on the inside of the wall 24. The track has an undulatory course to form short high and low sections, and long medial sections alternating therewith. Thus, when the rollers 26 are traveling along the medial sections, the clutch member 25 is held in neutral position, and when the rollers are on the high section the clutch member is shifted to drive the shaft 11 though pinion 12, and when the rollers are on the low section the clutch member is shifted to drive the shaft through the pinion 13. The passenger supports 15 are therefore yanked around first in one direction, and then in the opposite direction, with periods of rests therebetween.

I claim:

1. An amusement apparatus comprising a support, a rotatable member carried by a support, driving means for said member, rotatable shafts carried by said member, lateral arms carried by the shafts, passenger supports carried by the arms, pinions loose on the shafts, external and internal stationary annular racks with which the pinions respectively mesh, slidable clutch members on the shafts for establishing driving connections between the pinions and their shaft in alternation, and means for operating the clutch members.

2. An amusement apparatus comprising a support, a rotatable member carried by a support, driving means for said member, rotatable shafts carried by said member, lateral arms carried by the shafts, passenger supports carried by the arms, pinions loose on the shafts, external and internal stationary annular racks with which the pinions respectively mesh, slidable clutch members on the shafts for establishing driving connections between the pinions and their shaft in alternation, and automatic clutch actuating means.

3. An amusement apparatus comprising a support, a rotatable member carried by a support, driving means for said member, rotatable shafts carried by said member, lateral arms carried by the shafts, passenger supports carried by the arms, pinions loose on the shafts, external and internal stationary annular racks with which the pinions respectively mesh, slidable clutch members on the shafts for establishing driving connections between the pinions and their shaft in alternation, said clutch members being slidable on the shafts between the pinions, an undulatory annular track, and actuating devices for the clutch members engaging said track.

4. An amusement apparatus comprising a support, a rotatable member carried by a support, driving means for said member, rotatable shafts carried by said member, lateral arms carried by the shafts, passenger supports carried by the arms, pinions loose on the shafts, external and internal stationary annular racks with which the pinions respectively mesh, slidable clutch members on the shafts for establishing driving connections between the pinions and their shaft in alternation, said clutch members being slidable on the shafts between the pinions, an undulatory annular track, said track having relatively short upper and lower portions and long medial portions alternating therewith, and actuating devices for the clutch members engaging said track.

In testimony whereof I affix my signature.

JOSEPH CZERWONKA.